United States Patent
Bhattacharya et al.

(10) Patent No.: US 11,748,658 B2
(45) Date of Patent: Sep. 5, 2023

(54) SYSTEM AND METHOD FOR CATEGORICAL TIME-SERIES CLUSTERING

(71) Applicant: Tata Consultancy Services Limited, Mumbai (IN)

(72) Inventors: Sakyajit Bhattacharya, Kolkata (IN); Avik Ghose, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 573 days.

(21) Appl. No.: 17/025,137

(22) Filed: Sep. 18, 2020

(65) Prior Publication Data

US 2021/0081844 A1 Mar. 18, 2021

(30) Foreign Application Priority Data

Sep. 18, 2019 (IN) .............................. 201921037652

(51) Int. Cl.
*G06N 20/00* (2019.01)
*G06F 16/28* (2019.01)

(52) U.S. Cl.
CPC ........... *G06N 20/00* (2019.01); *G06F 16/285* (2019.01)

(58) Field of Classification Search
CPC .............................. G06F 16/285; G06N 20/00
See application file for complete search history.

(56) References Cited

U.S. PATENT DOCUMENTS

| | | | | |
|---|---|---|---|---|
| 7,657,102 B2* | 2/2010 | Jojic | ...................... | G11B 27/28 |
| | | | | 382/224 |
| 9,460,400 B2* | 10/2016 | De Bruin | ................ | G16H 10/40 |
| 11,553,870 B2* | 1/2023 | Le | ........................... | A61B 5/316 |
| 2018/0165554 A1* | 6/2018 | Zhang | ................. | G06F 18/2411 |
| 2018/0307943 A1 | 10/2018 | Savkli et al. | | |
| 2019/0142291 A1* | 5/2019 | Obeid | ................... | A61B 5/7203 |
| | | | | 706/12 |

(Continued)

OTHER PUBLICATIONS

Bielza, Frontiers in Computation Neuroscience, 2014, pp. 1-23.*

(Continued)

*Primary Examiner* — Michael I Ezewoko
(74) *Attorney, Agent, or Firm* — Finnegan, Henderson, Farabow, Garrett & Dunner, LLP

(57) ABSTRACT

This disclosure relates generally to categorical time-series clustering. In an embodiment, the method for categorical time-series clustering for categorical time-series associated with distinct subjects obtained from sensors. Based on the categorical time-series, the subjects are clustered into clusters by using a Markov chain model. Clustering the subjects include assigning each subject to a cluster. The subjects are assigned to the clusters by determining cluster-specific transition matrices based on a transitional probability of the subject's transitioning between states. A semi-distance function is constructed for each cluster-specific transitional matrix between the states at multiple time instances, which us indicative of a conditional probability of movement of the subject between the states at different time instance. Using an expectation maximization (EM) model, one or more latent variables of each of the cluster-specific transitional matrices are obtained to determine a likelihood of association of the subject to the cluster.

9 Claims, 6 Drawing Sheets

(56) References Cited

U.S. PATENT DOCUMENTS

2020/0218998 A1* 7/2020 Epperlein .............. G06N 20/00

OTHER PUBLICATIONS

Shishvan, 2018, IEEE, pp. 46419-46494.*
Ghassempour, Shima et al., "Clustering Multivariate Time Series Using Hidden Markov Models", Environmental Reseasrch and Public Health, 2014, MDPI, https://www.mdpi.com/1660-4601/11/3/2741.
Fruhwirth-Schnatter, Sylvia et al., "Bayesian Clustering of Categorical Time Series Using Finite Mixtures of Markov Chain Models", RePEc, 2009, Research Gate, https://www.labornrn.at/wp/wp0907.pdf.
Hunt, L.A., "Mixture Model Clustering of Data Sets with Categorical and Continuous Variables" Title of the item: Mixture Model Clustering of Data Sets with Categorical and Continuous Variables, 1994 Thebookshelf, http://www.thebookshelf.auckland.ac.nz/docs/NZOperationalResearch/conferenceproceedings/1994-proceedings/ORSNZ-proceedings-1994-49.pdf.
Frydman, Helina, "Estimation in the Mixture of Markov Chains Moving with Different Speeds", Journal of the American Statistical Association, 2005, Research Gate, https://www.researchgate.net/publication/4741692_Estimation_in_the_Mixture_of_Markov_Chains_Moving_With_Different_Speeds/link/0fcfd50eae514e089a000000/download.

* cited by examiner

SYSTEM AND METHOD FOR CATEGORICAL TIME-SERIES CLUSTERING

PRIORITY CLAIM

This U.S. patent application claims priority under 35 U.S.C. § 119 to: India Application No. 201921037652, filed on Sep. 18, 2019. The entire contents of the aforementioned application are incorporated herein by reference.

TECHNICAL FIELD

The disclosure herein generally relates to time-series clustering, and, more particularly, to system and method for categorical time-series clustering.

BACKGROUND

In many areas of applied statistics, like economics, finance, or public health, data are available in the form of panel or longitudinal data where repeated measurements are taken for a group of targets/subjects at several points in time. Hence, the observations for a single subject/target may form a time series. Standard methods for panel or longitudinal data analysis assume homogeneity across the subjects. Very often, however, it is of substantive interest to learn whether heterogeneity is present in the sense that the data generating mechanism is different across the individual time series. Such clustering of data is referred to as categorical time-series clustering.

SUMMARY

Embodiments of the present disclosure present technological improvements as solutions to one or more of the above-mentioned technical problems recognized by the inventors in conventional systems. For example, in one embodiment, a method for categorical time-series clustering is provided. The method includes obtaining, from a plurality of sensors, a plurality of categorical time-series associated with a plurality of subjects, via one or more hardware processors. Each categorical time-series from amongst the plurality of categorical time-series is associated with a distinct subject from amongst the plurality of subjects. Further the method includes clustering, based on the plurality of categorical time-series, the plurality of subjects into a plurality of clusters in an unsupervised manner by using a Markov chain model, via the one or more hardware processors. In an embodiment, assigning a subject from amongst the plurality of subjects into a cluster from amongst the plurality of clusters includes determining a plurality of cluster-specific transition matrices ($M_h$) based on a transitional probability of the subject's transitioning from a first state to a second state. Further assigning includes constructing, for each of the plurality of cluster-specific transitional matrices, a semi-distance function between the first state and the second state at multiple time instances. The semi-distance function is indicative of a conditional probability of movement of the subject from the first state at a first time instant to the second state at a second time instant. Furthermore, assigning includes obtaining, by using an expectation maximization (EM) model, one or more latent variables of each of the cluster-specific transitional matrices to determine a likelihood of association of the subject to the cluster.

In another aspect, a system for categorical time-series clustering is provided. The system includes one or more memories; and one or more first hardware processors, the one or more first memories coupled to the one or more first hardware processors, wherein the one or more first hardware processors are configured to execute programmed instructions stored in the one or more first memories, to obtain, from a plurality of sensors, a plurality of categorical time-series associated with a plurality of subjects. Each categorical time-series from amongst the plurality of categorical time-series is associated with a distinct subject from amongst the plurality of subjects. Further the one or more hardware processors are configured by the instructions to cluster, based on the plurality of categorical time-series, the plurality of subjects into a plurality of clusters in an unsupervised manner by using a Markov chain model. In an embodiment, to assign a subject from amongst the plurality of subjects into a cluster from amongst the plurality of clusters, the one or more hardware processors are configured by the instructions to determine a plurality of cluster-specific transition matrices ($M_h$) based on a transitional probability of the subject's transitioning from a first state to a second state. Further, to assign the one or more hardware processors are configured by the instructions to construct, for each of the plurality of cluster-specific transitional matrices, a semi-distance function between the first state and the second state at multiple time instances. The semi-distance function is indicative of a conditional probability of movement of the subject from the first state at a first time instant to the second state at a second time instant. Furthermore, to assign, the one or more hardware processors are configured by the instructions to obtain, by using an expectation maximization (EM) model, one or more latent variables of each of the cluster-specific transitional matrices to determine a likelihood of association of the subject to the cluster.

In yet another aspect, a non-transitory computer readable medium for categorical time-series clustering is provided. The method for categorical time-series clustering includes obtaining, from a plurality of sensors, a plurality of categorical time-series associated with a plurality of subjects, via one or more hardware processors. Each categorical time-series from amongst the plurality of categorical time-series is associated with a distinct subject from amongst the plurality of subjects. Further the method includes clustering, based on the plurality of categorical time-series, the plurality of subjects into a plurality of clusters in an unsupervised manner by using a Markov chain model, via the one or more hardware processors. In an embodiment, assigning a subject from amongst the plurality of subjects into a cluster from amongst the plurality of clusters includes determining a plurality of cluster-specific transition matrices ($M_h$) based on a transitional probability of the subject's transitioning from a first state to a second state. Further assigning includes constructing, for each of the plurality of cluster-specific transitional matrices, a semi-distance function between the first state and the second state at multiple time instances. The semi-distance function is indicative of a conditional probability of movement of the subject from the first state at a first time instant to the second state at a second time instant. Furthermore, assigning includes obtaining, by using an expectation maximization (EM) model, one or more latent variables of each of the cluster-specific transitional matrices to determine a likelihood of association of the subject to the cluster.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
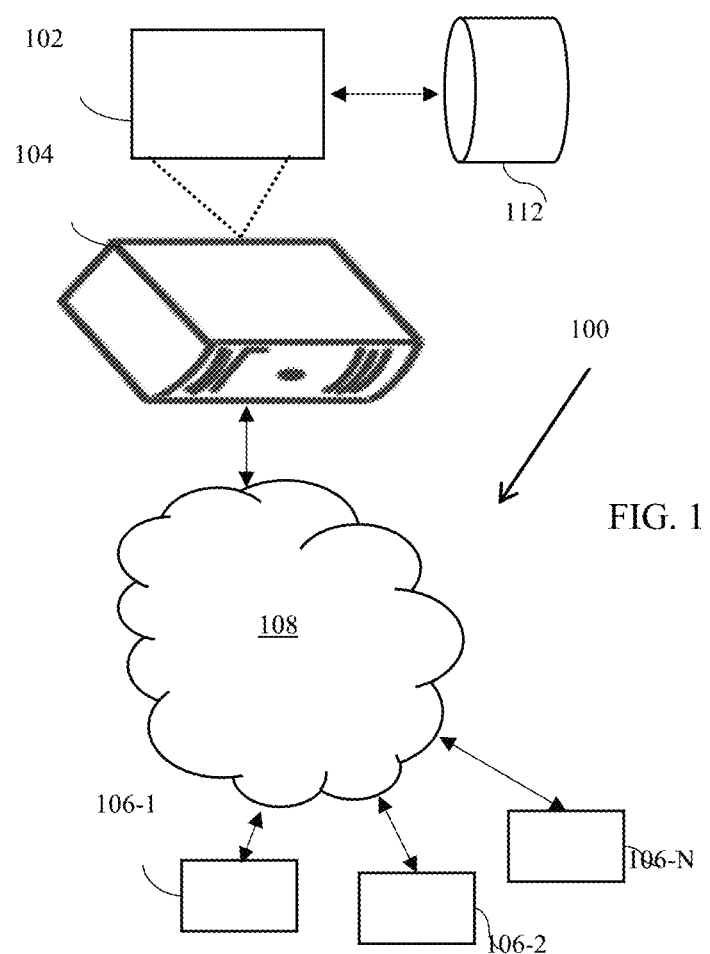
FIG. 1 illustrates an exemplary network environment for implementation of a system for categorical time-series clustering according to some embodiments of the present disclosure.

In many areas of applied statistics, like economics, finance, or public health, data are available in the form of panel or longitudinal data where repeated measurements are taken for a group of subjects at several points in time. Hence, the observations for a single subject form a time series. Standard methods for panel or longitudinal data analysis assume homogeneity across the subjects in the sense that all the time series can be described by the same data generating mechanism. Very often, however, it is of substantive interest to learn if heterogeneity is present in the sense that the data generating mechanism is different across the individual time series.

To capture heterogeneity across such time series it is common to assume that groups (or clusters) are present, such that each group can be characterized by a different/specific data generating mechanism. Each time series is considered to be a single entity belonging to one of these groups and all-time series within the same group are characterized by the same data generating mechanism. The main issue with such an approach is how the time series are assigned to the various groups/clusters.

A common procedure is to define the group's apriori in a deterministic manner, by stratifying the time series according to some observed covariates, and to estimate the data-generating mechanism independently for each group. It is then examined aposteriori, if the underlying data generating mechanism differs across the various strata. However, deterministic prior stratification may be incorrect wherein possibly unobserved variables define a true grouping and time series are assigned to the same group, although their underlying data generating mechanism is actually different from the assigned group. This might introduce a bias or a false positive, when estimating the group-specific parameters.

In the recent years, a new approach toward grouping of the time series became popular which is based on letting the timeseries data themselves define an appropriate grouping. In such an approach, the mechanism assigning each time series to a particular group is random rather than deterministic and is captured by a latent (endogenous) variable which is estimated along with the group-specific characteristics. Each time series has an apriori unknown probability to belong to a certain cluster/group. The corresponding prior assignment distribution may be either independent of the specific time series or may depend on characteristics of the time series such as the covariates that are typically used for deterministic prior stratification.

This approach is closely related to what has been known in statistics for many decades as (unsupervised) clustering. Unsupervised or endogenous clustering of time series is quite a recent issue, because the extension of common clustering techniques to time series is far from trivial. Distance-based clustering methods, for instance, cannot be easily extended to time series, where an appropriate distance measure is rather difficult to define. An alternative popular approach to cluster (non-time series) data is model-based clustering based on finite mixture models. As opposed to distance-based methods, model-based clustering extends to time series data in quite a natural way as shown by a known method. Another known technique provide further empirical evidence in the context of clustering gene expression time series that model-based clustering leads to meaningful results in cases where Euclidian-distance-based clustering methods fail. In model-based clustering, each time series is considered to be a single entity belonging to one of each H endogenous groups, where each group is described by a different data generating mechanism. In terms of mixture modeling, this leads to a multivariate finite mixture model with H components where the data generating mechanism of each group defines the component specific distribution. Clustering is achieved as for a traditional finite mixture model by assigning each time series to one of the H groups.

For clustering categorical time series, a known technique used a generalized version of Mover-Stayer model with constrained cluster-specific transition matrices. Another known technique extended to this work, where the number of clusters is unknown and needs to be estimated.

Various embodiments disclosed herein provide a system and method for clustering categorical time-series in a more generalized manner where the transition matrices are completely unconstrained, as will be described further in detail later.

Typically, any data attribute which is categorical in nature represents discrete values which belong to a specific finite set of categories or classes. The categorical data can be utilized in various applications. One such application that utilizes categorical data is monitoring of elderly people living alone. The clustering of such categorical data can further provide insights into the cognitive and physical well-being of such elderly people. Henceforth, such elderly may be referred to as 'subjects'. Herein, it will be noted that in some embodiments, the subjects are considered to include elderly people for the purpose of explanation and brevity of description. In alternate scenarios and embodiments, the term 'subject' shall encompass any individual, item, article, and so on whose movements have to be monitored, where such monitoring yields 'categorical data'.

The clustering based technique can be used to check heterogeneity in terms of movement behavior among subjects. The movement behavior can facilitate in detecting cognitive impairment based on the results of the clustering. Various conventional systems have illustrated a potential of passive unobtrusive home monitoring systems to identify living patterns and health and behavioral impairments of residents. For example, a SVM-based classification is used to identify activities of daily living in smart homes equipped with motion sensors, contact, temperature and hygrometry sensors. Another known technique classifies in-home activities such as grooming, toileting, meal preparation and going out using unobtrusive state-change sensors installed in a flat. A known system tested Mild Cognitive Impairment (MCI) to find association with the connectivity patterns that are altered in the resting state and during cognitive tasks. Some of the known techniques describe how anomalous behavior can be detected using smart home sensors for dementia patients. A conventional method showed how monitoring the activities of daily living can lead to detection of MCI. This method is based on micro monitoring which requires users to carry out tasks like usage of mobile devices. However, often in reality, aged people are not very conversant with the use of technology. It will be understood that monitoring daily life can provide diagnostic yield in early detection of MCI. However, the work requires very detailed activity log for providing clinical accuracy. A conventional method facilitates for detection of MCI from sensor data. However, such methods need large amount of labeled data, and are unable to perform longitudinal analysis.

Various embodiments described herein provides method and system for clustering of categorical data obtained from sensors capable of monitoring movements of subjects such as elderly individuals, such clustering can facilitate in early detection of MCI in the subjects. Herein, it will be understood the various embodiments herein are described by taking reference to the application of elderly care for the ease of understanding of description; however, the disclosed embodiments are applicable for various other applications that involves monitoring and analysis of categorical data. In an embodiment, the disclosed method for clustering of categorical data includes capturing time-series corresponding to each of the subjects using the un-obtrusive sensor such as motion sensor, contact sensor, pressure sensors and so on.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through 6, where similar reference characters denote corresponding features consistently throughout the figures, there are shown preferred embodiments and these embodiments are described in the context of the following exemplary system and/or method.

FIG. 1 illustrates an example network implementation 100 of a system 102 for categorical time-series clustering in accordance with an example embodiment. In an embodiment, the categorical time-series are derived based on a monitoring of elderly people over a period of time. In an embodiment, the system 102 analyses the categorical time-series may be utilized in clustering subjects into equivalent sets (or similar with respect to clustering characteristics). For example, in a practical application, during clinical trials which are an important part of drug discovery and care improvement, selecting a correct set for control and treatment groups for the trial is a challenging task. Such trials are often carried out manually by statisticians. Generally, patient characteristics like phenotype, mobility, history and genotype are considered for the selecting the subjects. With advent of instrumented trials, such grouping becomes further important for analysis since sensor data often varies more within the group than subjective evaluation by experts. Hence, it becomes important to aid the statistician and clinician in this application. In one exemplary embodiment, presently proposed system and method of clustering for categorical time-series multi-dimensional and multi-parameter data, aids in grouping patients into equivalent sets, which further aids in selection process for a clinical trial.

Herein, it will be understood that the various embodiments herein are described by taking reference to the application of elderly care for the ease of understanding of description, however, the disclosed embodiments are applicable for various other application that involves monitoring and analysis of categorical data.

Although the present disclosure is explained considering that the system 102 is implemented on a server, it may be understood that the system 102 may also be implemented in a variety of computing systems 104, such as a laptop computer, a desktop computer, a notebook, a workstation, a cloud-based computing environment and the like. It will be understood that the system 102 may be accessed through one or more devices 106-1, 106-2 . . . 106-N, collectively referred to as devices 106 hereinafter, or applications residing on the devices 106. Examples of the devices 106 may include, but are not limited to, a portable computer, a personal digital assistant, a handheld device, a Smartphone, a tablet computer, a workstation and the like. The devices 106 are communicatively coupled to the system 102 through a network 108.

In an embodiment, the network 108 may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the system 102 through communication links.

As discussed above, the system 102 may be implemented in a computing device 104, such as a hand-held device, a laptop or other portable computer, a tablet computer, a mobile phone, a PDA, a smartphone, and a desktop computer. The system 102 may also be implemented in a workstation, a mainframe computer, a server, and a network server. In an embodiment, the system 102 may be coupled to a data repository, for example, a repository 112. The repository 112 may store data processed, received, and generated by the system 102. In an alternate embodiment, the system 102 may include the data repository 112.

The network environment 100 supports various connectivity options such as BLUETOOTH®, USB, ZigBee and other cellular services. The network environment enables connection of devices 106 such as Smartphone with the server 104, and accordingly with the database 112 using any communication link including Internet, WAN, MAN, and so on. In an exemplary embodiment, the system 102 is implemented to operate as a stand-alone device. In another embodiment, the system 102 may be implemented to work as a loosely coupled device to a smart computing environment. The components and functionalities of the system 102 are described further in detail with reference to FIGS. 2-6.

Figure 2:
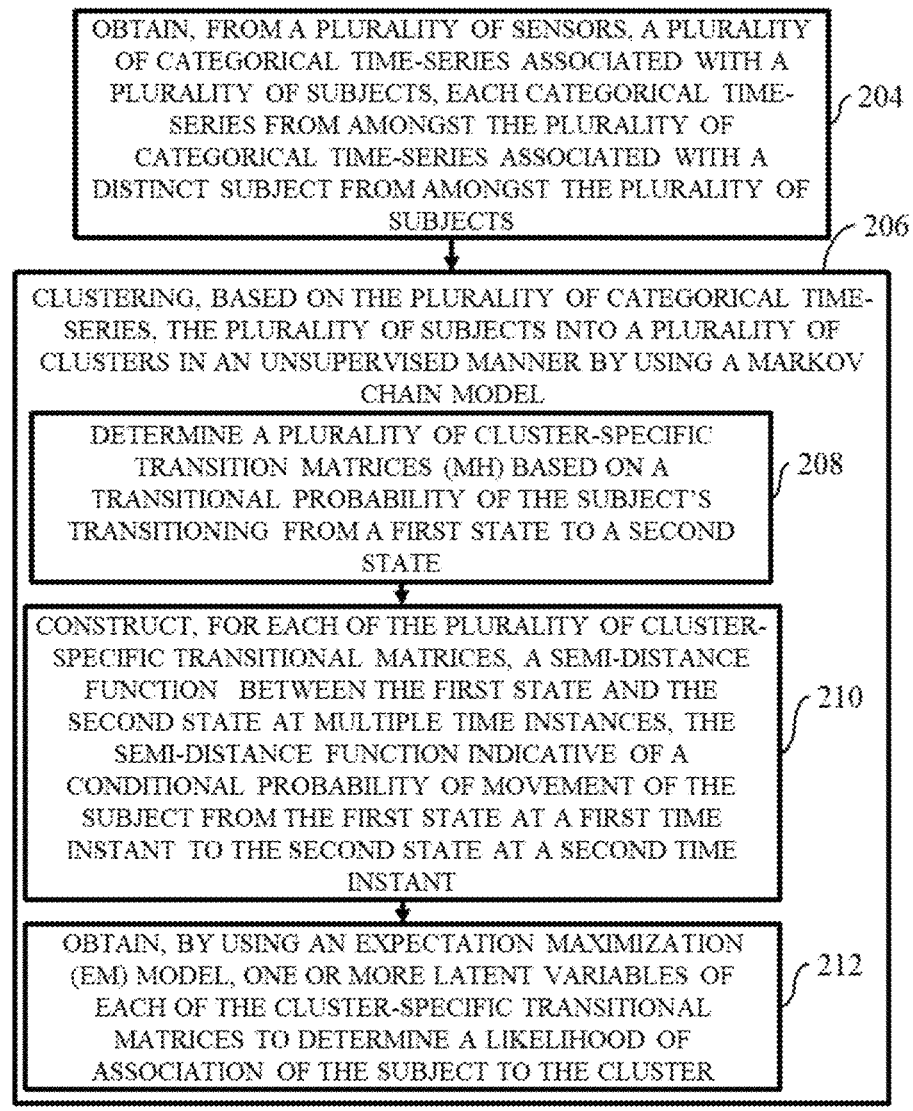
FIG. 2 is a flow diagram for a method for categorical time-series clustering according to some embodiments of the present disclosure.
Figure 3:
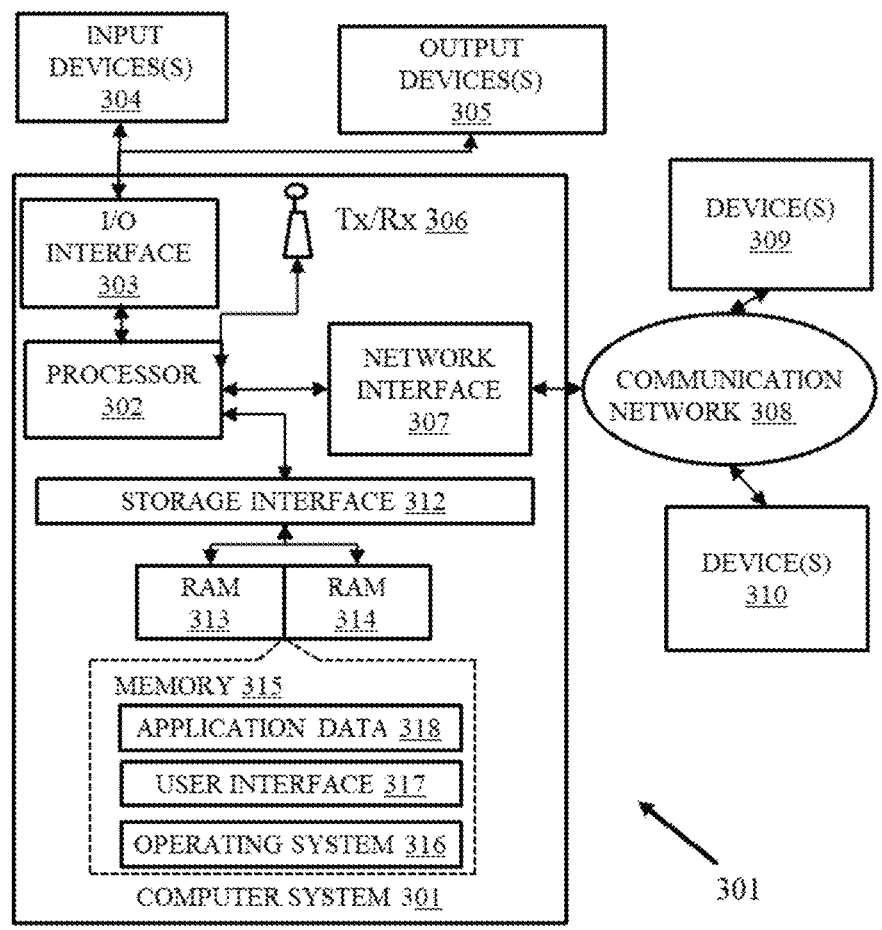
FIG. 3 illustrates a block diagram of an exemplary computer system for implementing embodiments consistent with the present disclosure.
Figure 4:
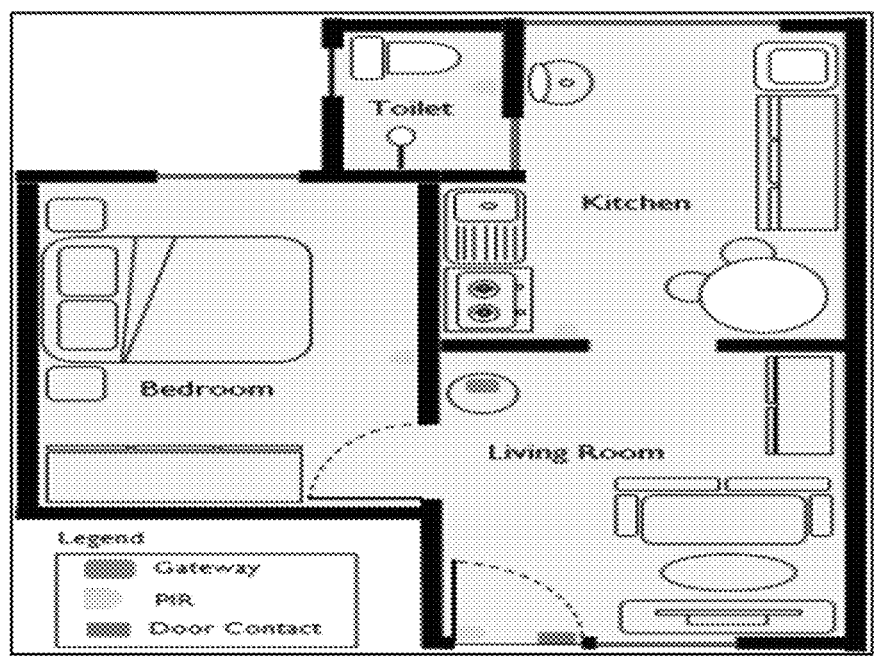
FIG. 4 is an example layout of a premise incorporating sensors for capturing categorical time-series data corresponding to multiple subjects for clustering, according to some embodiments of the present disclosure.
Figure 5A:
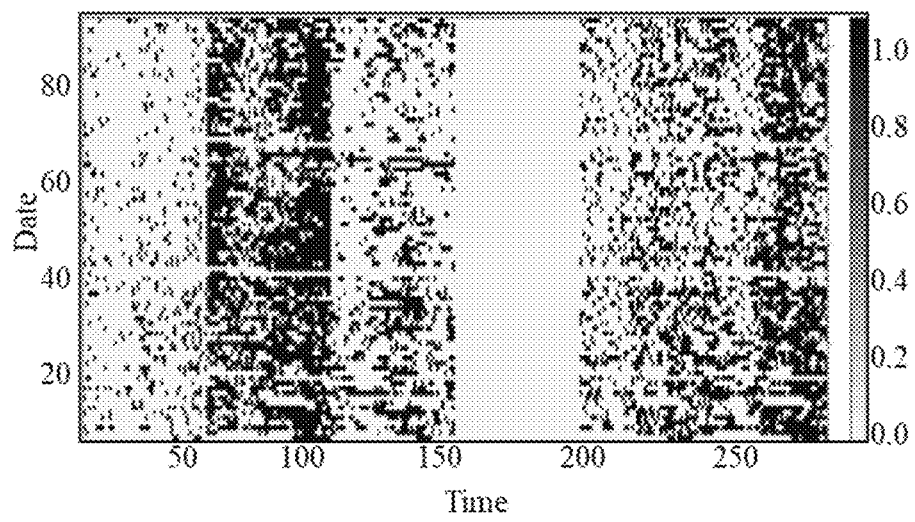
FIGS. 5A-5C are heat map plots showing behavior sets for various subjects of FIG. 4, according to some embodiments of the present disclosure.
Figure 5B:
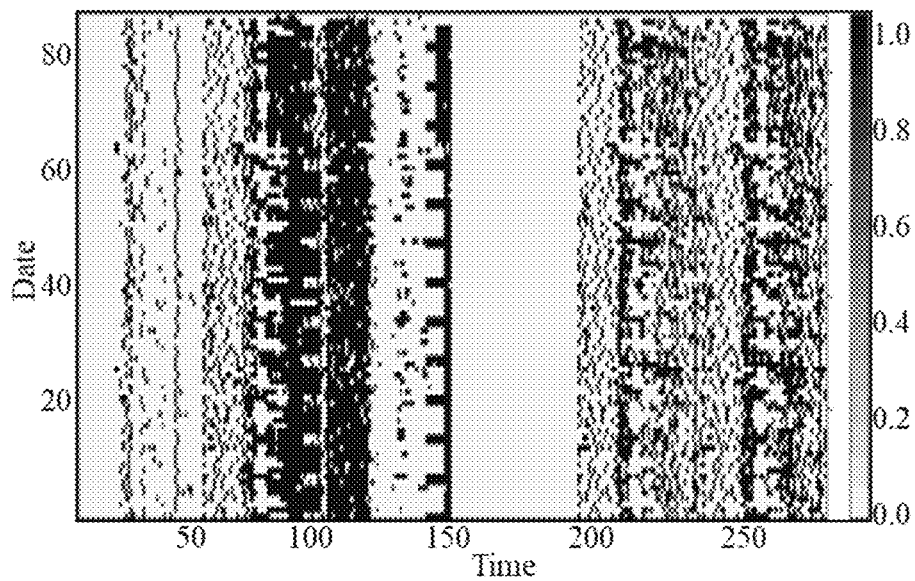
Figure 5C:
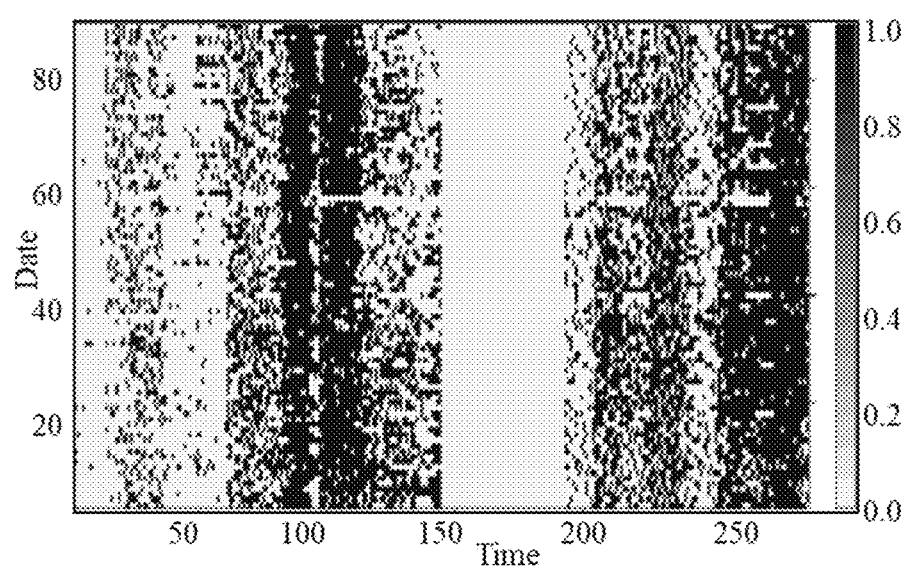
Figure 6:
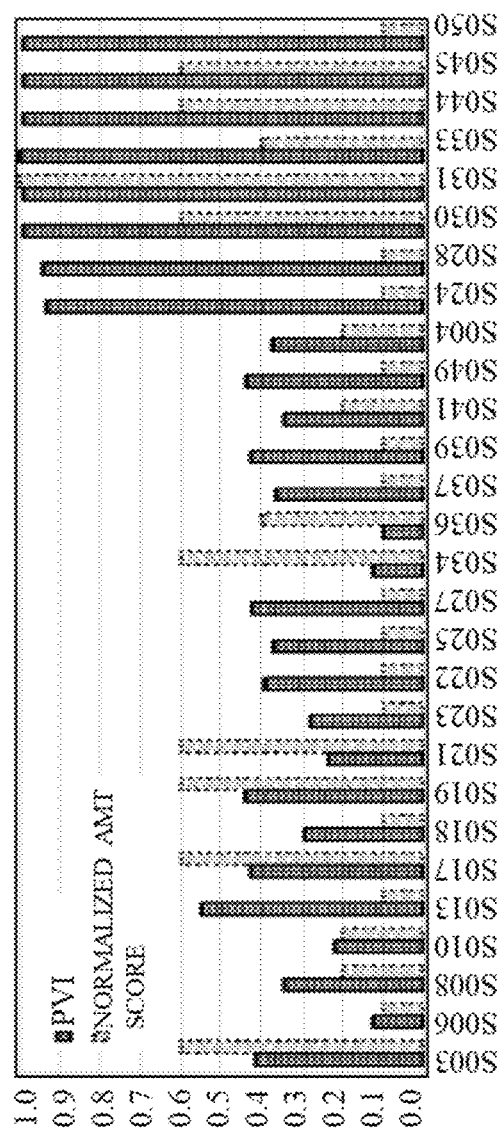
FIG. 6 illustrates a graphical representation of a correlation between a sensor based method and parameter normalized AMT score, according to some embodiments of the present disclosure.

Referring collectively to FIGS. 2-4, components and functionalities of the system 102 for categorical time-series clustering are described in accordance with an example embodiment. For example, FIG. 2 illustrates a flow diagram for a method for categorical time-series clustering, in accordance with an example embodiment of the present disclosure. FIG. 3 illustrates a block diagram of an exemplary computer system for implementing embodiments consistent with the present disclosure. FIG. 4 illustrates an example layout of a premises occupied by a subject and plurality of sensors incorporated in the premises, in accordance with an example scenario of the present disclosure. FIGS. 5A-5C illustrates behavior space representation for various subjects monitored using six (6) sensors, in accordance with example embodiments. FIG. 6 illustrates a graphical representation of correlation between sensor based method and parameter normalized AMT score in accordance with an example embodiment.

In an embodiment, movements of a plurality of subjects are monitored over a period of time to obtain a plurality of categorical time-series. In an embodiment, the movements of the plurality of subjects are obtained based on monitoring performed by the plurality of sensors or monitoring data captured by the plurality of sensors. Said sensors may be implemented/incorporated in premise where the subject may be residing. An example of a premise incorporating sensors for monitoring movement of the elderly people is illustrated and described further with reference to FIG. 4.

The sensor data derived for the plurality of subjects may include categorical time-series. Herein, the sensor data may provide information of the subject's position at a certain time point, and thus the data so received is not numerical, rather has a categorical value. The disclosed system applies unsupervised learning based methods on the categorical data so that the subjects can be partitioned/categorized in meaningful groups. A practical application of such clustering is that it may differentiate between subjects with varying movement behaviors, so that subjects with and without cognitive impairment can be separated without any prior knowledge about their condition. A method for categorical time-series clustering is described further with reference to FIG. 2.

At 202, a plurality of categorical time-series associated with a plurality of subjects are obtained. Each categorical time-series from amongst the plurality of categorical time-series is associated with a distinct subject from amongst the plurality of subjects. For example, considering $y_{it}$, (t=1, 2, ..., T and i=1, 2, ..., n) be a set of categorical time-series observations each one for n subjects. Here, the number of categories may be assumed to be K.

At 204, the method 200 includes clustering the subjects in an unsupervised manner by a mixture model based approach according to the time series behavior associated with the subjects. In an embodiment, clustering the categorical time-series is performed by a first-order time-homogeneous Markov chain model, as will be described further in detail with reference to 206-210.

In an embodiment, clustering the subjects using the Markov chain model includes determining a plurality of cluster-specific transition matrices ($M_h$) based on a transitional probability of the subject's transitioning from a first state to a second state. Herein, it will be noted that the first state and the second state can be obtained from the categorical time series associated with the subject. If there are H clusters, then a Markov chain model with cluster-specific transition matrix $M_h$ for h=1, 2, ..., H is generated.

The first-order time-homogeneous Markov chain model where the transition matrix is $M=\{\xi_{jk}\}$ where j,k=1, 2, ..., K and $\xi_{jk}=P(y_{it}=k|y_{i,t-1}=j)$. If there are H clusters then the Markov chain model with cluster-specific transition matrix $M_h$ for h=1, 2, ..., H.

At 208, the method for clustering further includes constructing, for each of the plurality of cluster-specific transitional matrices, a semi-distance function between the first state and the second state at multiple time instances. Herein, the semi-distance function is indicative of a conditional probability of movement of the subject from the first state at a first time instant to the second state at a second time instant. The semi-distance function may be constructed using the transition matrix. If the observation at time point t−1 is at state j (for t=1, 2, ..., T and j=1, 2, ..., K), then the probability that the observation may be at state k in the next time-point t is given by the transition $M=\{\xi_{jk}\}$ where j,k=1, 2, ..., K and $\xi_{jk}=P(y_{it}=k|y_{i,t-1}=j)$, as described below.

Herein, a modified and unconstrained version of mixture of Markov chains is applied. This is a generalization of the mover-stayer model which postulate a simple form of population heterogeneity. There are two types of individuals in the population: movers and stayers. Movers evolve according to a Markov chain with an intensity matrix Q, whereas stayers stay in their initial states with the transition probability matrix as the identity matrix. Thus, the transition probability matrix, M(t) of a continuous time mover-stayer model on state space D={1, 2, ..., K} is $$M(t)=SI+(I-S)\exp(TQ)$$

where S is a diagonal matrix with j-th diagonal element as $s_j$, j=1, 2, ..., K defined as
$s_j$=proportion of individuals among those who are initially in state j who are stayers.

Herein, it is assumed that H=2. Another assumption here is that the transition matrices are related in such a way that $M_2=I-\Gamma_2(I-M_1)$ where I is the identity matrix and $\Gamma_h$=diag $(\lambda_{h,1}, ..., \lambda_{h,K})$ with $0\leq\lambda_{h,1}\leq 1/(1-\xi_{i,jj})$.

The clustering kernel is defined as $p(y_i|M2)=\Pi_{j=1}^{K}\Pi_{j=1}^{K}\xi_{h,jk}^{N_{i,jk}}$ where $N_{i,jk}=\mathcal{N}(y_{i,t}=k; y_{i,t-1}=j)$ is the cardinality of transitions from state j to state k observed in time series i. So, for subject i the expected length of stay in state j of a Markov chain governed by $M_1$ is $1/(1-\xi_{i,jj})$ and that governed by $M_2$ is $1/[\lambda_{2,i}(1-\xi_{i,jj})]$. Then, the discrete-time mixture has the r-step transition probability matrix given by:

$$M^{(r)}=SM_2^{(r)}+(I-S)M_1^{(r)}$$

where S is a diagonal matrix with i-th diagonal element as $s_i$, defined as the proportion of subjects initially in state i whose movement follows the rule of $M_2$. The parameters to be estimated are $s_i$, $m_{jj}^1$, $m_{jk}^1$, and $\Delta_i$ where $m_{jj}^1$, $m_{jk}^1$ are the diagonal and off-diagonal elements of $M_1$, respectively, for j,k=1, 2, ..., k and j≠k.

Herein, it will be noted that the semi-distance function is non-negative since $0\leq\xi_{j,k}\leq 1$. However, the distance from state j to state k is not necessarily same as the distance from state k to state j, because it can happen that $\xi_{j,k}\neq\xi_{k,j}$ since the transition matrix may not be symmetric. Thus, the property of symmetricity is not necessarily preserved. However, the triangle law holds true, i.e. for any three states j, k, l, $\epsilon_{jk}+\xi_{kl}\geq\xi_{jl}$. The aforementioned function is called a semi-distance function since symmetricity does not necessarily hold true.

At 210, the method includes obtaining, by using an expectation maximization (EM) model, one or more latent variables of each of the cluster-specific transitional matrices to determine a likelihood of association of the subject to the cluster. Here, the one or more (unknown) latent variables are $Y_i=1$ if $y_i$ is generated by $M_2$ and $Y_i=0$ otherwise for $i=1, 2, \ldots, n$. Then the complete log-likelihood of $(y_1, y_2, \ldots, y_n)$ is:

$$\log L = \sum_{i=1}^{n} \left[ y_i \left( \log L_i^{M_2} + \sum_{j=1}^{K} I_j^i \log s_j \right) + (1-Y_i) \left( \log L_i^{M_1} + \sum_{j=1}^{K} I_j^i \log(1-s_j) \right) \right]$$

where, $L_i^{M_1} = \Pi_{j,k}(m_{jk}^1)^{N_{ijk}}$ and $L_i^{M_2} = \Pi_{j,k}(m_{jk}^2)^{N_{ijk}}$. The log likelihood is maximized using the expectation maximization steps of the EM model. The model goes on in an iterative manner until the difference between estimates in one iteration and the previous one is less than a pre-defined threshold. Herein, it will be noted that the threshold may be defined a-priori. In an embodiment, the threshold may be around 5% of the parametric values in the present iteration.

If the final estimate of $Y_i$ is more than 0.5 then the time series is generated by $M_2$, else, from $M_1$. However, if there is a draw, i.e. three features suggest one cluster and three other suggest another, then a sum of estimated $Y_{is}$ for each feature is determined. For example, $a=\Sigma(Y_i-0.5)$ is defined where the sum is taken over the features indicating time series generated by $M_2$. Similarly, $b=\Sigma(0.5-Y_i)$ is defined where the sum is taken over the features indicating time series generated by $M_1$. If $a>b$, the observation (or the subject) is assigned to cluster generated by $M_2$; else, the observation (or the subject) is assigned to the other cluster.

It will be understood that herein $M_1$ and $M_2$ are completely unconstrained. Observations (or the subjects) are assigned to one cluster or the other according to the estimate of the latent variable $Y_i$ from the EM model. An example block diagram of a computer system implementing the method 200 is described further with reference to FIG. 3.

FIG. 3 is a block diagram of an exemplary computer system 301 for implementing embodiments consistent with the present disclosure. The computer system 301 may be implemented in alone or in combination of components of the system 102 (FIG. 1). Variations of computer system 301 may be used for implementing the devices included in this disclosure. Computer system 301 may comprise a central processing unit ("CPU" or "hardware processor") 302. The hardware processor 302 may comprise at least one data processor for executing program components for executing user- or system-generated requests. The processor may include specialized processing units such as integrated system (bus) controllers, memory management control units, floating point units, graphics processing units, digital signal processing units, etc. The processor may include a microprocessor, such as AMD Athlon™, Duron™ or Opteron™, ARM's application, embedded or secure processors, IBM PowerPC™, Intel's Core, Itanium™' Xeon™, Celeron™ or other line of processors, etc. The processor 302 may be implemented using mainframe, distributed processor, multi-core, parallel, grid, or other architectures. Some embodiments may utilize embedded technologies like application specific integrated circuits (ASICs), digital signal processors (DSPs), Field Programmable Gate Arrays (FPGAs), etc.

Processor 302 may be disposed in communication with one or more input/output (I/O) devices via I/O interface 303. The I/O interface 303 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 303, the computer system 301 may communicate with one or more I/O devices. For example, the input device 304 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc.

Output device 305 may be a printer, fax machine, video display (e.g., cathode ray tube (CRT), liquid crystal display (LCD), light-emitting diode (LED), plasma, or the like), audio speaker, etc. In some embodiments, a transceiver 306 may be disposed in connection with the processor 302. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 302 may be disposed in communication with a communication network 308 via a network interface 307. The network interface 307 may communicate with the communication network 308. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 308 may include, without limitation, a direct interconnection, local area network (LAN), wide area network (WAN), wireless network (e.g., using Wireless Application Protocol), the Internet, etc. Using the network interface 307 and the communication network 308, the computer system 301 may communicate with devices 309 and 310. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 701 may itself embody one or more of these devices.

In some embodiments, the processor 302 may be disposed in communication with one or more memory devices (e.g., RAM 313, ROM 314, etc.) via a storage interface 312. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, any databases utilized in this disclosure.

The memory devices may store a collection of program or database components, including, without limitation, an operating system 316, user interface application 317, user/application data 318 (e.g., any data variables or data records discussed in this disclosure), etc. The operating system 516 may facilitate resource management and operation of the computer system 301. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 317 may facilitate display, execution, interaction, manipulation, or operation of program components through textual or graphical facilities. For example, user interfaces may provide computer interaction interface elements on a display system operatively connected to the computer system 301, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 301 may store user/application data 318, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, structured text file (e.g., XML), table, or as hand-oriented databases (e.g., using HandStore, Poet, Zope, etc.). Such databases may be consolidated or distributed, sometimes among various computer systems discussed above. It is to be understood that the structure and operation of any computer or database component may be combined, consolidated, or distributed in any working combination.

Additionally, in some embodiments, the server, messaging and instructions transmitted or received may emanate from hardware, including operating system, and program code (i.e., application code) residing in a cloud implementation. Further, it should be noted that one or more of the systems and methods provided herein may be suitable for cloud-based implementation. For example, in some embodiments, some or all of the data used in the disclosed methods may be sourced from or stored on any cloud computing platform.

Example Scenario

An example layout of a premises occupied by subject is shown in FIG. 4. As illustrated in FIG. 4, the premises include a home that is instrumented with a plurality of sensors. The sensors may include passive infra-red (PIR) motion and magnetic door contact sensors which by nature are non-intrusive and privacy preserving. A shown in FIG. 4, each home may be equipped with at least 4 PIR motion sensors, one in each room. In addition, a door contact sensor is mounted at the main entrance of the dwelling. All sensors may communicate with backend cloud servers through a homebased gateway transmitting data over a data network. In an example scenario, the motion sensors may report at 0.1 Hz while the door sensor may follow an event-driven reporting scheme.

In an example scenario, the layout of FIG. 4 was utilized for extracting actionable insights based on data collected from a smart home for elderly persons consisting of passive unobtrusive sensors like motion, contact and pressure sensors. As a practical implementation of disclosed embodiments, said data can be utilized to derive actionable insights on the early assessment and monitoring of geriatric problems like Mild Cognitive Impairment (MCI) which is a neuro-degenerative disorder and a precursor to dementia and Alzheimer's disease. Although the aforementioned conditions are irreversible, they can be managed better if detected early.

In the present experimental scenario, the sensor enabled premises (such as those described with reference to FIG. 4) were implemented and connected to the cloud server. The data so collected from such premises provides important insights into the activities of daily living, and hence can be mined to deduce actionable insights into the lives of the subjects. Said data can be mined understand MCI or any other condition affecting the residents of such premises. In that direction, the disclosed system and method for categorical time-series clustering determines whether the subjects are heterogeneous in terms of their behavior. If there is evidence of heterogeneity (i.e. if there are more than one well-separated cluster), then said evidence can be utilized for studying the MCI.

In the present experiment, the participants were selected if they were at least 65 years of age, living alone and enrolled with a local Voluntary Welfare Organizations with prior written consent for voluntary participation. The demographics of the participants are listed in Table I.

TABLE 1

| Characteristic | Category | % a |
|---|---|---|
| Age | 60-64 | 6.5 |
| | 65-74 | 26 |
| | 75-84 | 54.3 |
| | ≥85 | 13 |
| Gender | Male | 42.2 |
| | Female | 57.8 |
| Ethnicity | Chinese | 87 |
| | Malay | 4.3 |
| | Indian | 4.3 |
| | Others | 4.3 |
| Education | No formal | 39.1 |
| | Primary | 39.1 |
| | Secondary | 19.6 |
| | Post-secondary | 2.2 |
| Marital status | Single | 39.1 |
| | Married | 6.5 |
| | Separated | 2.2 |
| | Divorced | 19.6 |
| | Widowed | 32.6 |

It will be noted that clustering of the categorical time-series according to movement behavior of elderlies is helpful in providing a suitable initial indication in case there are significant difference in the patients' behavior, prior to delving deeper to check MCI. Such segregation/separation of subjects into clusters facilitates in providing a technical advantage of saving resources required for computations.

Moreover, the disclosed clustering facilitates in accurate capturing of subjects into specific clusters.

For the determination of MCI, it should be noted that the MCI can cause the subject to have a higher variance in behavior owing to disintegration of his/her daily routine. As for each user data is 0/1, for each day, Initial Behavior per Sensor defined as IBS is an array of length 24×60×60. Value at position i of the array is 1 if sensor output at that time is 1. Then, for each sensor, for a given time interval (denoted by $T_f$) each day is segmented into fragments of $T_f$=30 minutes. This is a configuration parameter, and can be adjusted as needed. The i-th entry $BS_{sensor}(i)$=1 if for that sensor at least one entry in IBS is 1 for that interval, $BS_{sensor}(i)$=0 otherwise.

Then for each sensor, corresponding $BS_{sensor}(i)$ is obtained. This is termed as quantified behavior. All sensor values were appended in any fixed order to obtain consolidated behavior as OB=[$BS_{sensor1}$|$BS_{sensor2}$|$BS_{sensor3}$| · · · |$BS_{sensorN}$]. Then, for each day overall behavior ($OB_{Day}$) for each user is computed/appended.

Let $S_{Behav}{}^i$ denote the set of all behaviors of user 'i', given as:

$$S_{Behav}{}^i = \{OB_{Day}{}^i | Day \in 30 \text{ day window}\}$$

Herein, the set of all behaviors constitute categorical time-series. Then, suitable time interval has to be chosen for a meaningful analysis. $T_f$=30 is chosen for the present example scenario. In this case, in order to quantify behavior variation the following steps were taken:

1) First an average personal behavior is computed:

$$OB_{Average} = \text{mean}(OB_{Day}) \text{ for those } N \text{ days, Default } N > 50.$$

2) Then daily behavior deviation is computed, $BD_{Day} = (OB_{Day} - OB_{Average})$.
3) This in turn is followed by principal component analysis on $BD_{Day}$. It is elucidated how many eigenvector (percentage of total number of days) is necessary to explain 90% variance for behavior deviation. This number is taken as Personal Variation Index denoted by, $PVI_{User}$.
4) To quantify behavior variation $PVI_{User}$ is computed and compared across group.

Since all of the used sensors in the data collection setup provide binary categorical output (0 or 1), each behavior is quantified in terms of such binary sensor values. The present analysis for multiple sensor usage (i.e. no. of times a sensor gives '1'/TRUE vales) shows variation among users. Initially, sensors such as a sensor on door knob and another on bed are considered.

TABLE II

Variation of Total Event Count with Change in Interval

| | Door Knob | | Bedroom | |
|---|---|---|---|---|
| Interval | Mean | Sd | Mean | sd |
| 1 m | 5.5 | 1.8 | 30.3 | 12.2 |
| 5 m | 5.4 | 1.7 | 16.6 | 5 |
| 10 m | 5.4 | 1.7 | 13.4 | 4 |
| 20 m | 5.3 | 1.7 | 11.4 | 2.9 |
| 30 m | 5.2 | 1.7 | 10.2 | 2.6 |
| 60 m | 5 | 1.6 | 8.4 | 1.9 |

Different event count (with interval) for multiple sensors were analyzed and it was observed that 20-40 minutes is the most suitable value for $T_f$. Table II shows how event count varies for two sensors (namely Door knob and Bedroom). With very low value of $T_f$, 1's in very close proximity in IBS gets registered as separate event. Thus, for proposed analysis value of $T_f$ (Time window or interval) is chosen to be 30 minutes. Then, behavior set (i.e. $S_{Behav}{}^i$) for each of the user is computed. Linear Span of $S_{Behav}{}^i$, denoted by $B_{space i}$ is the behavior subspace, where i is the user number. Distance between two subspaces can be easily quantized using geodesic distance (for same dimension) or chordal distance (for different dimension) between them.

The outcome of the disclosed method for clustering of categorical time-series is described below. In particular, the following describes application of the disclosed categorical time-series clustering system on the data and data findings using MCI.

For an initial analysis, the movement data of ten persons was taken over a considerable period of time. Among these ten subjects, six were female and four were male. Six of the subjects have age between 75 and 84. Two are more than 84, and the rest two are between 65 and 75. The data consist of 6 features, each indicating location of the patients at a given time. The disclosed method of clustering was performed for each feature. Then each subject was assigned to a cluster using majority rule. Herein, S004, S024, and so on indicate the subjects' identification number, which is presented in Table III. The first cluster, i.e. the cluster generated from $M_2$ has 6 observations and the other cluster has 4 observations. The underlying idea in clustering such a way is that, those who belong to cluster 1 can swiftly transit from one Markovian state to another, while the others take relatively longer time. The clustering process thus identifies two types of movement behavior. Thus, it can be concluded that there is evidence to believe that patients are heterogenous with respect to their movement and related behavior. The AMT test in the following subsection confirms the finding of the disclosed system and shows that the patients in cluster 2 have MCI or some other type of age-related problems that might be the sign of early MCI onset.

TABLE III

Subject Clustering

| Cluster 1 | 1 | 4 | 28 | 30 | 33 | 44 |
|---|---|---|---|---|---|---|
| Cluster 2 | 2 | 24 | 31 | 45 | | |

Each behavior set $S_{Behav}{}^i$, can be represented as a heat map plot as given in FIG. 5A.

Each date (row) represents behavior for that day. Such plot gives us an indication of user behavior over time. A thick blue column signifies behavior consistency (i.e. behavior is more repetitive, less erratic). In FIG. 5B behavior of another user (S003) with more behavior al consistency than S031 is presented. S003 is female, born in 1938 (80 years old) divorced. The cognition for all users were assessed through Abbreviated Mental Test score. A score above 7 is considered normal. AMT was assessed at the baseline in April/May 2016 and at the follow-up in October 2016. A total of 4 patients were detected under cluster 2 (Table 1). S031 (79, female) and S045 (64, male) showed AMT scores 5 and 7 respectively, suggesting a possibility of cognitive impairment. Moreover, S045 performed poorly for the Geriatric Depression Scale (14 out of 15), exhibiting symptoms of depression, as illustrated in FIG. 5C. He also suffers from Epilepsy and has a fall history due to fits. S031 has reported having memory issues and is not able to recall recent conversations. Although S002 (77, female) scored 8 for the AMT test, she was reported as having memory loss. Thus, for each user, quantification serves a purpose of preparing data for visual representation. For all subjects marked with MCI who did not have a bad AMT score, a manual background check was performed. It was found that they had other lifestyle related abnormalities which had caused the method to classify them incorrectly. Some example abnormalities were:

A subject had a history of fall and also had a recent liver surgery.

A subject's daughter was diagnosed with cardiac problems and hospitalized.

A subject had a recent history of being absent from the house for long hours, the purpose of such trips is unknown.

A subject S034 was found to have an extremely cluttered home and also forgets medications, may be early indications of MCI missed by the last AMT survey.

For a large dataset it was impractical to assess each user behavior visually. Once obtained $S_{Behav}^i$ for each of the user, PVI computation was conducted. Then, the computed PVI was used for identification of subject who had shown higher variation. If the normalized PVI was more than 0.9 for a subject, (s)he was identified as a potential case for MCI. The disclosed sensor based method was correlated with Abbreviated Mental Test (AMT) score, which was in range 1-10, where 10 means the healthiest mental state. In order to compare, the score was normalized using formula given in equation (1):

$$normScore = 1 - \frac{(score - \min(score))}{(\max(score) - \min(score))} \quad (1)$$

The comparison results between normalized scores are provided in FIG. 6.

Various embodiments disclosed herein provide method and system for categorical time-series clustering. The disclosed system and method facilitate in clustering for categorical time-series multi-dimensional and multi-parameter data in affective clusters/groups. In an embodiment, the disclosed method utilizes Markov Chain model approach to determine a semi-distance function. According to the time series behavior of targets, for instance, subjects (as disclosed in example embodiments) the disclosed system clusters said targets into meaningful clusters by utilizing Markov Chain model approach. In an embodiment, the disclosed system determines a semi-distance function based on a cluster-specific transition matrix obtained from the Markov Chain model. Said semi-distance function is indicative of a conditional probability of movement of the target from the first state at a first time instant to the second state at a second time instant. Based on such determination, the target can be clustered into a specific cluster, for example, for effective grouping of patients within a peer group for instrumented trial, monitoring and assessment.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
    obtaining, from a plurality of sensors, a plurality of categorical time-series associated with a plurality of subjects, via one or more hardware processors, wherein each categorical time-series from amongst the plurality of categorical time-series associated with a distinct subject from amongst the plurality of subjects; and
    clustering, based on the plurality of categorical time-series, the plurality of subjects into a plurality of clusters in an unsupervised manner by using a Markov chain model to assign the plurality of subjects to the plurality of clusters, via the one or more hardware processors, assigning a subject from amongst the plurality of subjects into a cluster from amongst the plurality of clusters comprises:
        determining a plurality of cluster-specific transition matrices ($M_h$) based on a transitional probability of the subject's transitioning from a first state to a second state, the plurality of cluster-specific transition matrices ($M_h$) associated with the Markov Chain Model and obtained from the plurality of categorical time-series;
        constructing, for each of the plurality of cluster-specific transitional matrices, a semi-distance function between the first state and the second state at multiple time instances, the semi-distance function indicative of a conditional probability of movement of the subject from the first state at a first time instant to the second state at a second time instant; and
        obtaining, by using an expectation maximization (EM) model, one or more latent variables of each of the cluster-specific transitional matrices to determine an association of the subject to the cluster;

wherein the one or more latent variables comprises a logarithmic function as shown below:

$$\text{Log } L = \sum_{i=1}^{n}\left[y_i\left(\log L_i^{M_2} + \sum_{j=1}^{k} l_j^i \log s_j\right) + (1-y_i)\left(\log L_i^{M_1} + \sum_{j=1}^{k} l_j^i \log(1-s_j)\right)\right]$$

where, $L_i^{M_1} = \Pi_{j,k}(m_{jk}^1)^{N_{i,jk}}$ and $L_i^{M_2} = \Pi_{j,k}(m_{jk}^2)^{N_{i,jk}}$ Wherein, the one or more latent variables are $Y_i=1$ if $y_i$ is generated by $M_2$ and $Y_i=0$ otherwise for i=1, 2, ... ,n, Wherein, the logarithmic function Log L is a summation of cluster-specific transitional matrices based on the transitional probability of the subject's transitioning from the first state $L_i^{M_1}$ to the second state $L_i^{M_2}$ associated with the Markov Chain Model, Where, $m_{jk}^1$ is an off-diagonal element of $M_1$, $m_{jk}^2$ is an off-diagonal element of $M_2$, $N_{i,jk}$ is a cardinality of transitions from state j to state k observed in time series i and $s_j$ is a $j^{th}$ diagonal element in a diagonal matrix with a state j of the Markov Chain Model.

2. The processor implemented method of claim 1, wherein the plurality of categorical time-series are obtained based on a monitoring of movements of the plurality of subjects over a period of time by the plurality of sensors.

3. The processor implemented method of claim 2, wherein the plurality of sensors comprises passive unobtrusive sensors.

4. The processor implemented method of claim 1, wherein each of the plurality of categorical time-series comprises categorical parameters comprising qualitative variables associated with the plurality of subjects.

5. A system (300) comprising:
one or more memories (304); and
one or more first hardware processors (302), the one or more first memories (304) coupled to the one or more first hardware processors (302), wherein the one or more first hardware processors (302) are configured to execute programmed instructions stored in the one or more first memories (304), to:
obtain, from a plurality of sensors, a plurality of categorical time-series associated with a plurality of subjects, each categorical time-series from amongst the plurality of categorical time-series associated with a distinct subject from amongst the plurality of subjects; and
cluster, based on the plurality of categorical time-series, the plurality of subjects into a plurality of clusters in an unsupervised manner by using a Markov chain model to assign the plurality of subjects to the plurality of clusters, wherein to assign a subject from amongst the plurality of subjects into a cluster from amongst the plurality of clusters, the one or more hardware processors are configured by the instructions comprises:
determine a plurality of cluster-specific transition matrices ($M_h$) based on a transitional probability of the subject's transitioning from a first state to a second state, the plurality of cluster-specific transition matrices ($M_h$) associated with the Markov Chain Model and obtained from the plurality of categorical time-series;
construct, for each of the plurality of cluster-specific transitional matrices, a semi-distance function between the first state and the second state at multiple time instances, the semi-distance function indicative of a conditional probability of movement of the subject from the first state at a first time instant to the second state at a second time instant; and
obtain, by using an expectation maximization (EM) model, one or more latent variables of each of the cluster-specific transitional matrices to determine an association of the subject to the cluster,
wherein the one or more latent variables comprises a logarithmic function as shown below:

$$\text{Log } L = \sum_{i=1}^{n}\left[y_i\left(\log L_i^{M_2} + \sum_{j=1}^{k} l_j^i \log s_j\right) + (1-y_i)\left(\log L_i^{M_1} + \sum_{j=1}^{k} l_j^i \log(1-s_j)\right)\right]$$

where, $L_i^{M_1} = \Pi_{j,k}(m_{jk}^1)^{N_{i,jk}}$ and $L_i^{M_2} = \Pi_{j,k}(m_{jk}^2)^{N_{i,jk}}$ wherein, the one or more latent variables are $Y_i=1$ if $y_i$ is generated by $M_2$ and $Y_i=0$ otherwise for i=1, 2, ... ,n, wherein, the logarithmic function Log L is a summation of cluster-specific transitional matrices based on the transitional probability of the subject's transitioning from the first state $L_i^{M_1}$ to the second state $L_i^{M_2}$ associated with the Markov Chain Model, where, $m_{jk}^1$ is an off-diagonal element of $M_1$, $m_{jk}^2$ is an off-diagonal element of $M_2$, $N_{i,jk}$ is a cardinality of transitions from state j to state k observed in time series i and $s_j$ is a $j^{th}$ diagonal element in a diagonal matrix with a state j of the Markov Chain Model.

6. The system of claim 5, wherein the one or more hardware processors are configured to obtain the plurality of categorical time-series based on a monitoring of movements of the plurality of subjects over a period of time by the plurality of sensors.

7. The system of claim 6, wherein the plurality of sensors comprises passive unobtrusive sensors.

8. The system of claim 6, wherein each of the plurality of categorical time-series comprises categorical parameters comprising qualitative variables associated with the plurality of subjects.

9. One or more non-transitory machine readable information storage mediums comprising one or more instructions which when executed by one or more hardware processors cause:
obtaining, from a plurality of sensors, a plurality of categorical time-series associated with a plurality of subjects, via one or more hardware processors, wherein each categorical time-series from amongst the plurality of categorical time-series associated with a distinct subject from amongst the plurality of subjects; and
clustering, based on the plurality of categorical time-series, the plurality of subjects into a plurality of clusters in an unsupervised manner by using a Markov chain model to assign the plurality of subjects to the plurality of clusters, via the one or more hardware processors, assigning a subject from amongst the plurality of subjects into a cluster from amongst the plurality of clusters comprises:
determining a plurality of cluster-specific transition matrices ($M_h$) based on a transitional probability of the subject's transitioning from a first state to a second state, the plurality of cluster-specific transition matrices ($M_h$) associated with the Markov Chain Model and obtained from the plurality of categorical time-series;
constructing, for each of the plurality of cluster-specific transitional matrices, a semi-distance function between the first state and the second state at multiple time instances, the semi-distance function indicative of a conditional probability of movement of the subject from the first state at a first time instant to the second state at a second time instant; and obtaining, by using an expectation maximization (EM) model, one or more latent variables of each of the cluster-specific transitional matrices to determine an association of the subject to the cluster, wherein the one or more latent variables comprises a logarithmic function as shown below:

$$\text{Log } L = \sum_{i=1}^{n} \left[ y_i \left( \log L_i^{M_2} + \sum_{j=1}^{k} l_j^i \log s_j \right) + (1 - y_i)(\log L_i^{M_1} + \sum_{j=1}^{k} l_j^i \log(1 - s_j)) \right]$$

where, $L_i^{M_1} = \Pi_{j,k}(m_{jk}^1)^{N_{i,jk}}$ and $L_i^{M_2} = \Pi_{j,k}(m_{jk}^2)^{N_{i,jk}}$ wherein, the one or more latent variables are $Y_i=1$ if $y_i$ is generated by $M_2$ and $Y_i=0$ otherwise for i=1, 2, . . . ,n, wherein, the logarithmic function Log L is a summation of cluster-specific transitional matrices based on the transitional probability of the subject's transitioning from the first state $L_i^{M_1}$ to the second state $L_i^{M_2}$ associated with the Markov Chain Model, where, $m_{jk}^1$ is an off-diagonal element of $M_1$, $m_{jk}^2$ is an off-diagonal element of $M_2$, $N_{i,jk}$ is a cardinality of transitions from state j to state k observed in time series i and $s_j$ is a $j^{th}$ diagonal element in a diagonal matrix with a state j of the Markov Chain Model.

* * * * *